United States Patent
Xie et al.

(10) Patent No.: US 8,880,488 B1
(45) Date of Patent: Nov. 4, 2014

(54) EFFICIENT EXTENT-BASED B-TREE INSERTION

(71) Applicant: EMC Corporation, Hopkinton, MA (US)

(72) Inventors: Gang Xie, Beijing (CN); Junping Zhao, Beijing (CN); Kevin Xu, Warren, NJ (US); Jialin Yang, Beijing (CN); Wei Qi, Beijing (CN); Fenghua Hu, Beijing (CN)

(73) Assignee: EMC Corporation, Hopkinton, MA (US)

( * ) Notice: Subject to any disclaimer, the term of this patent is extended or adjusted under 35 U.S.C. 154(b) by 243 days.

(21) Appl. No.: 13/630,010

(22) Filed: Sep. 28, 2012

(51) Int. Cl.
G06F 17/30 (2006.01)

(52) U.S. Cl.
USPC .......................................... 707/704

(58) Field of Classification Search
None
See application file for complete search history.

(56) References Cited

U.S. PATENT DOCUMENTS

| | | |
|---|---|---|
| 6,804,733 B1 | 10/2004 | Michel et al. |
| 7,113,936 B1 | 9/2006 | Michel et al. |
| 7,711,716 B2 | 5/2010 | Stonecipher |
| 7,809,868 B1 | 10/2010 | Mu |
| 8,060,521 B2 | 11/2011 | Lemar et al. |
| 8,176,013 B2 | 5/2012 | Passey et al. |
| 8,176,023 B2 * | 5/2012 | Graefe .......................... 707/704 |
| 8,200,700 B2 | 6/2012 | Moore et al. |
| 8,214,400 B2 | 7/2012 | Fachan et al. |
| 8,347,088 B2 | 1/2013 | Moore et al. |
| 2005/0102255 A1 * | 5/2005 | Bultman .......................... 707/1 |

* cited by examiner

Primary Examiner — Belix M Ortiz Ditren
(74) Attorney, Agent, or Firm — BainwoodHuang (57) ABSTRACT

A technique manages access to a B-tree structure within a data storage apparatus. The B-tree structure maintains mappings of data blocks of a file system to data blocks of a snapshot storage area. The technique involves imposing a lock on the B-tree structure in response to a snapshot operation which copies a contiguous range of file system data blocks to a set of snapshot data blocks to save primary data of the file system as snapshot data. The technique further involves inserting multiple objects into the B-tree structure while the lock is imposed, each object including a key value which (i) identifies a respective file system data block of the contiguous range and (ii) operates as a search key to facilitate searching of nodes of the B-tree structure. The technique further involves releasing the lock imposed on the B-tree structure after the objects have been inserted into the B-tree structure.

20 Claims, 6 Drawing Sheets

EFFICIENT EXTENT-BASED B-TREE INSERTION

BACKGROUND

A typical data storage system includes a set of storage processors and an array of storage devices. Each storage processor performs, on behalf of one or more external hosts, input/output (IO) operations such as store operations to store host data in the array, and load operations to load host data from the array.

Some data storage systems perform snapshot operations to save versions of host data at particular times. When a snapshot is taken by a storage processor, the storage processor copies old host data from a production file system (i.e., a current version of the host data) to a designated snapshot area before the old host data is overwritten with new host data. As a result, the snapshot is formed via a combination of unchanged host data which still resides in the production file system (i.e., primary data) and the host data copied to the designated snapshot area (i.e., snapshot data).

One conventional data storage system, which provides snapshot functionality, uses a B-tree data structure to track where the snapshot data is stored in the designated snapshot area and to provide fast lookup of the snapshot data. During system operation, each time a storage processor copies primary data from a block location of the production file system to a block location of the designated snapshot area, the storage processor individually locks and updates a section of the B-tree data structure with a mapping pair, i.e., a software construct containing the block number of the block location of the production file system and the block number of the block location of the designated snapshot area. That is, each time a block of the production file system is copied to the designated snapshot area, the B-tree data structure is locked and updated with a new mapping pair. To restore a snapshot of the production file system, the mapping pairs within the B-tree data structure are accessed to identify which blocks of the production file system have changed, and where the blocks containing snapshot data are located within the designated snapshot area thus enabling proper assembly of the snapshot.

SUMMARY

Unfortunately, there are deficiencies with the above-identified conventional data storage system which individually locks and updates a section of the B-tree data structure with a new mapping pair each time primary data is copied from a block location of the production file system to a block location of the snapshot area (i.e., one at a time). For example, for a thread running on a storage processor to acquire a lock on a section of the B-tree data structure, the thread must first request the lock. If that section of the B-tree data structure is currently locked, the thread must wait for the current lock to be relinquished before obtaining the lock. In a multi-threaded environment, sections of the B-tree data structure may suffer from high lock contention where multiple threads contend for the same sections of the B-tree data structure. As a result, the multi-threaded environment may generate a significant amount of unnecessary lock management overhead which consumes system resources to support lock management.

In contrast to the above-described conventional data storage system which individually locks and updates a section of the B-tree structure with a new mapping pair each time a block of primary data is copied from the production file system to the designated snapshot area, improved techniques involve imposing a lock on a B-tree structure while the B-tree structure is updated with multiple mappings in response to copying of a contiguous range of data blocks between a file system and a snapshot storage area. Such fast B-tree insertion techniques may involve aggregating consecutive file system blocks into an extent, and performing a single extent-based B-tree insertion operation based on the extent. The resulting B-tree structure may have the same organization as if the B-tree structure had been updated individually via individual insertion operations one at a time. However, with the improved techniques, data reflecting an entire extent of multiple data blocks is inserted with one insertion operation which significantly reduces B-tree insertion pressure, eases lock contention, and reduces overhead consumption.

One embodiment is directed to a method of managing access to a B-tree structure which is performed in a data storage apparatus. The B-tree structure is constructed and the B-tree structure while the lock is imposed (i.e., locking the B-tree structure just once), each object including a key value which (i) identifies a respective file system data block of the contiguous range of file system data blocks copied to the snapshot storage area and (ii) operates as a search key to facilitate searching of nodes of the B-tree structure. The method further includes releasing the lock imposed on the B-tree structure after the multiple objects have been inserted into the B-tree structure.

In some arrangements, inserting the multiple objects into the B-tree structure while the lock is imposed includes, for each file system data block of the contiguous range of files system data blocks of the file system copied to the set of snapshot data blocks of the snapshot storage area, saving a respective block number mapping pair corresponding to that file system data block in the B-tree structure. The respective block number mapping pair includes (i) a file system block number identifying that file system data block and (ii) a snapshot block number identifying a snapshot data block of the set of snapshot data blocks storing original host data copied from that file system data block. In these arrangements, multiple block number mapping pairs are saved in the B-tree structure while the lock is imposed.

Another embodiment is directed to a method of managing access to a B-tree structure having multiple nodes. The method includes imposing a lock on at least a portion of the B-tree structure, inserting multiple keyed objects into the B-tree structure while the lock is imposed. Each keyed object includes a key value to operate as a key in a node of the B-tree structure. The method further includes releasing the lock after the multiple keyed data objects have been inserted into the B-tree structure.

Other embodiments are directed to electronic systems and devices, processing circuits, computer program products, and so on. Some embodiments are directed to various data storage methods, components and circuitry which are involved in managing access to a B-tree structure.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves imposing a lock on a B-tree structure while the B-tree structure is updated with multiple mappings in response to copying of a contiguous range of data blocks between a file system and a snapshot storage area. Such a fast B-tree insertion technique may involve aggregating consecutive file system blocks into an extent, and performing a single extent-based B-tree insertion operation based on the extent. The resulting B-tree structure may have the same organization as if the B-tree structure had been updated individually via individual insertion operations one at a time. However, with the improved technique, data reflecting an entire extent of multiple data blocks is inserted with one insertion operation which significantly reduces B-tree insertion pressure, eases lock contention, and reduces overhead consumption.

Figure 1:
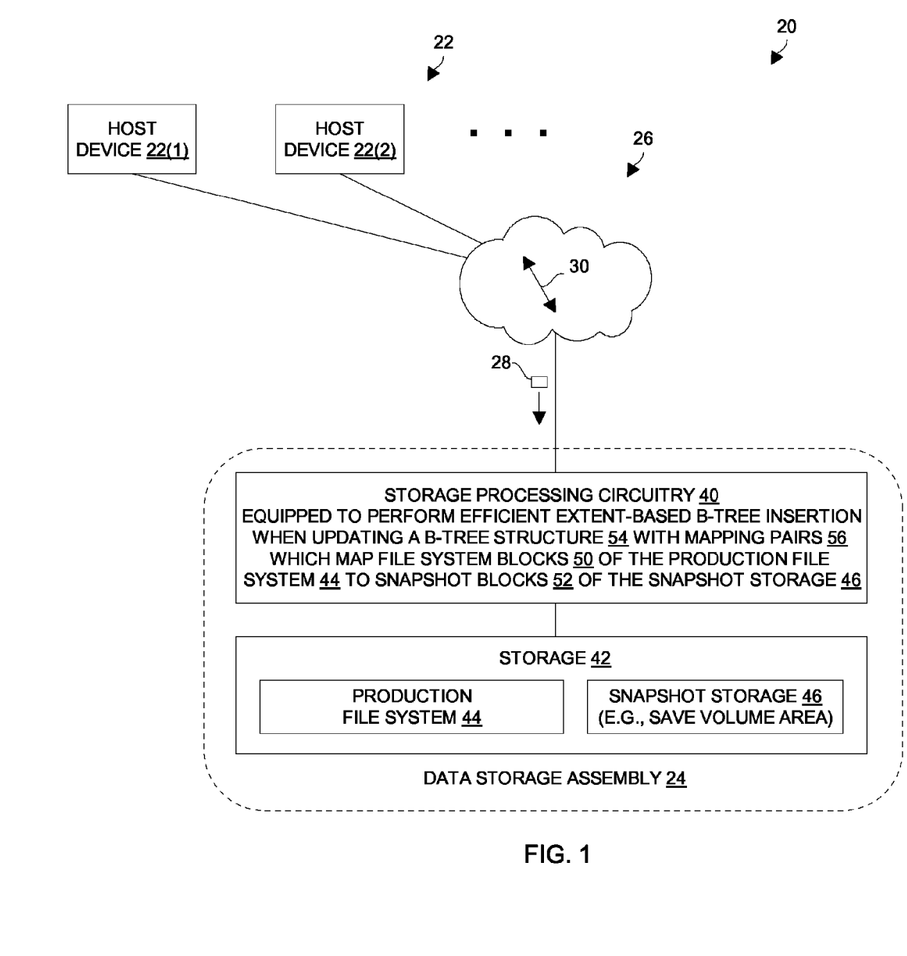
FIG. 1 is a block diagram of a data storage environment which employs efficient extent-based B-tree insertion.

FIG. 1 shows a data storage environment 20 which is equipped to perform efficient extent-based B-tree insertion when updating a B-tree structure (i.e., a B-tree, a B+ tree, or similar tree structure used for fast searching). The data storage environment 20 includes host devices 22(1), 22(2), . . . (collectively, host devices 22), a data storage assembly 24, and communications medium 26.

The host devices 22 are constructed and arranged to store data into and load data from the data storage assembly 24. Along these lines, each host device 22 is capable of providing IO instructions 28 to the data storage assembly 24 (e.g., read IOs and write IOs in the form of SCSI commands, iSCSI commands, etc.).

The data storage assembly 24 includes storage processing circuitry 40, and storage 42. The storage processing circuitry 40 is constructed and arranged to manage host data in the storage 42 by processing the IO instructions 28 from the host devices 22.

The communications medium 26 connects the various components of the data storage environment 20 together to enable these components to exchange electronic signals 30 (e.g., see the double arrow 30). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

During operation, the storage processing circuitry 40 stores host data into the production file system 44, and loads host data from the production file system 44 in response to the host IO instructions 28 from the host devices 22. During such operation, the storage processing circuitry 40 is capable of capturing snapshots of the production file system 44 (i.e., prior versions of the production file system 44).

If a snapshot of the production file system 44 is taken, the storage processing circuitry 40 copies old host data from block locations 50 of the production file system 44 (i.e., primary data) to block locations 52 within the snapshot storage 46 (i.e., saved as snapshot data) before the block locations 50 of the production file system 44 are overwritten with new host data. As the storage processing circuitry 40 makes these block transfers, the storage processing circuitry 40 updates a B-tree structure 54 with mapping pairs 56 which map the file system block locations 50 to the snapshot block locations 52 (e.g., using block numbers of a mapping space). As will be explained in further detail shortly, the storage processing circuitry 40 performs extent-based B-tree insertion operations in which data reflecting an entire extent of multiple data blocks is inserted into the B-tree structure 54 in a single operation and using a single lock on the B-tree structure 54. Such operation reduces the total number of B-tree insertion operations needed to update the B-tree structure 54, decreases lock contention, and reduces overhead.

It should be understood that the storage processing circuitry 40 is capable of being directed to take snapshots of the production file system 44 manually or automatically. For example, a user may provide a snapshot command to the storage processing circuitry 40 which directs the storage processing circuitry 40 to take a snapshot of the production file system 44. Additionally, the storage processing circuitry 40 may periodically receive snapshot commands to capture snapshots of the production file system 44 during set times, e.g., in response to commands from a scheduler utility.

It should be understood that, when a snapshot is taken, the storage processing circuitry 40 creates snapshot metadata to manage snapshot data for a potential restore. The storage processing circuitry 40 then performs copy operations (e.g., copy on first write or CoFW operations) to copy blocks of primary data to the snapshot storage 46 before that primary data is overwritten by new host data. The B-tree structure 54 is part of the metadata that the storage processing circuitry 40 maintains in order to perform a potential restore. Further details will now be provided with reference to FIG. 2.

Figure 2:
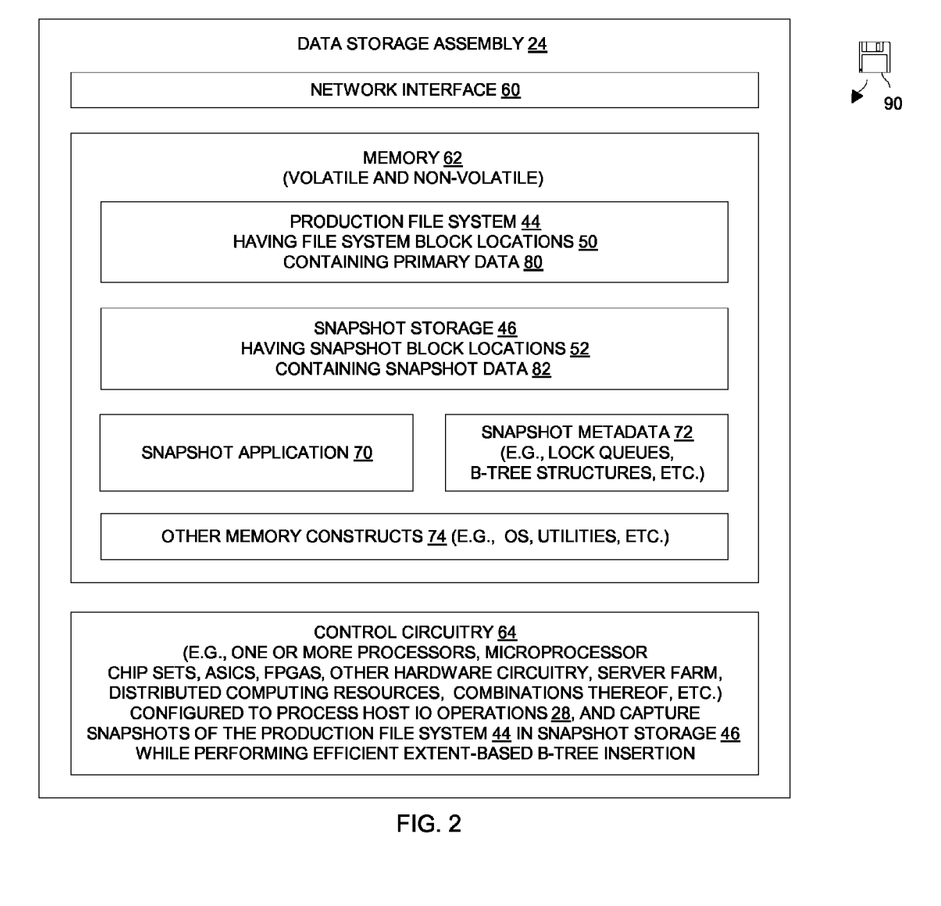
FIG. 2 is a block diagram of a data storage assembly of the data storage environment of FIG. 1.

FIG. 2 shows particular details of the data storage assembly 24 of the data storage environment 20. As shown, the data storage assembly 24 includes a network interface 60, memory 62, and control circuitry 64.

The network interface 60 is constructed and arranged to connect the data storage assembly 24 to the communications medium 26. Accordingly, the network interface 60 enables the data storage assembly 24 to communicate with the other components of the data storage environment 20 (e.g., see the host devices 22 in FIG. 1).

The memory 62 is intended to represent both volatile memory (e.g., fast semiconductor-based memory) and non-volatile memory (e.g., flash and disk memory, etc.) of the data storage assembly 24. As shown, the memory 62 stores the production file system 44 and the snapshot storage 46 (also see the storage 42 in FIG. 1), as well as a snapshot application 70, snapshot metadata 72 (e.g., specialized instructions to perform efficient B-tree insertion, B-tree structures, etc.), and other memory constructs 74 (e.g., an operating system, utilities, tools, etc.).

The control circuitry 64 is constructed and arranged to perform host IO operations 28 (i.e., process SCSI commands) on behalf of the host devices 22 (FIG. 1). Additionally, the control circuitry 84 is constructed and arranged to efficiently maintain snapshots of the production file system 44 as well as generate restored production file systems 44 from the snapshots. During such activity, the control circuitry manages a B-tree structure which contains mappings of block numbers of file system block locations 50 containing primary data 80 to block numbers of snapshot block locations 52 containing snapshot data 82.

It should be understood that the control circuitry 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 90 is capable of delivering all or portions of the software to the data storage assembly 24. The computer program product 90 has a non-transitory (or non-volatile) computer readable storage medium which stores a set of instructions which controls one or more operations of the data storage assembly 24. Examples of suitable computer readable storage media include tangible articles of manufacture and apparatus which store instructions in a non-volatile manner such as CD-ROM, flash memory, disk memory, tape memory, and the like.

During operation, the data storage assembly 24 performs snapshot operations to save primary data at particular times. In particular, the memory 62 provides a memory space which is addressable via block numbers. When a snapshot is taken, the control circuitry 64 copies primary data from file system block locations 50 of the production file system 44 to snapshot block locations 52 of the snapshot storage 46. Additionally, the control circuitry 64 generates mapping pairs of the block numbers of the file system block locations 50 which contained the primary data and the block numbers of the snapshot block locations 52 which now contain the snapshot data. The control circuitry 64 then updates a B-tree structure with these mapping pairs in order to enable subsequent snapshot restoration.

In particular, the control circuitry 64 attempts to aggregate contiguous block numbers of file system block locations 50 into extents and then perform a single B-tree insertion operation which inserts multiple mapping pairs under a single lock. Such operation reduces the number of B-tree insertion operations, decreases lock contention on the B-tree structure, as well as lowers overhead vis-à-vis a conventional scheme of locking and insertion into a B-tree structure again and again for each block copied from a production file system to a snapshot area. Further details will now be provided with reference to FIGS. 3 through 5.

Figure 3:
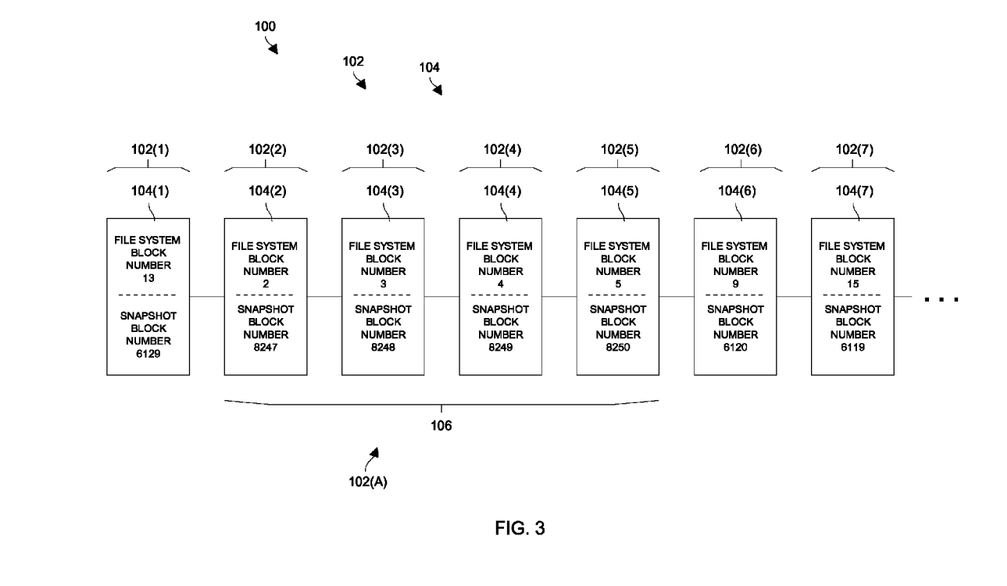
FIG. 3 is a block diagram of an example series of insertion tasks which are queued for processing by the data storage assembly of FIG. 2.
Figure 4:
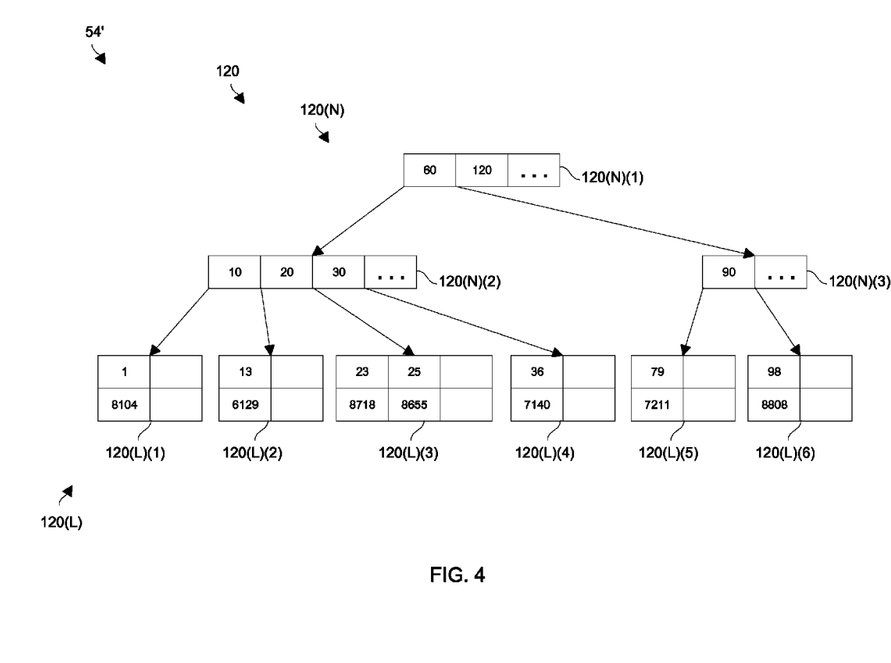
FIG. 4 is a block diagram of an example B-tree structure which is used to map file system blocks to snapshot blocks before an extent-based B-tree insertion operation is performed.
Figure 5:
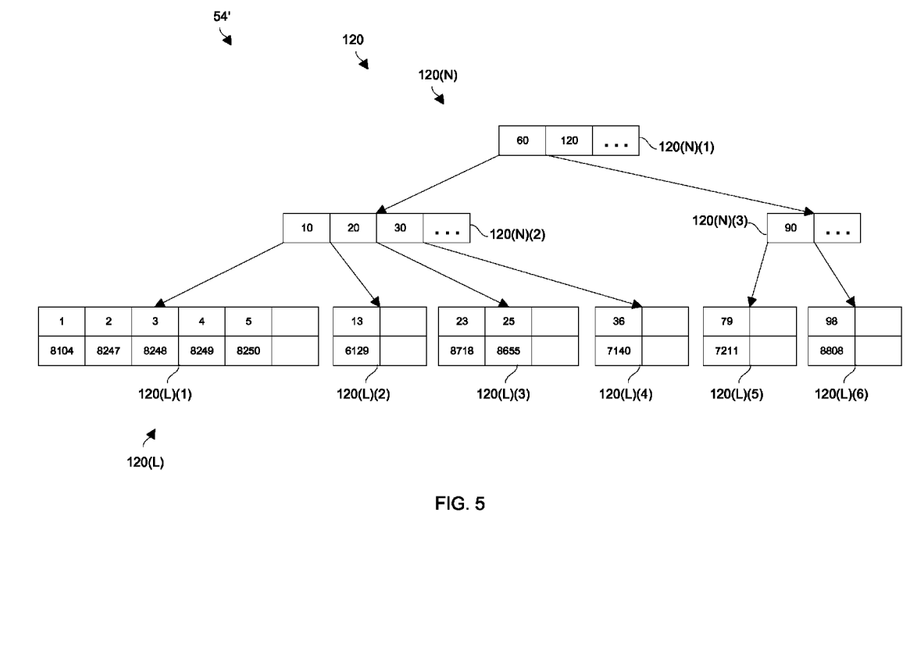
FIG. 5 is a block diagram of the example B-tree structure after the extent-based B-tree insertion operation is performed.

FIGS. 3 through 5 illustrate a single extent-based B-tree insertion operation which is performed on an example B-tree structure 54'. FIG. 3 shows an example series of insertion tasks which are queued for processing by the control circuitry 64 (also see FIG. 2). FIG. 4 shows the example B-tree structure 54' which is used to map file system blocks to snapshot blocks before the control circuitry 64 performs the extent-based B-tree insertion operation. FIG. 5 shows the example B-tree structure 54' after the extent-based B-tree insertion operation.

As shown in FIG. 3 and by way of example, when the control circuitry 64 of the data storage assembly 24 (FIG. 2) performs a series of block transfer operations to move blocks of primary data from the production file system 44 (FIGS. 1 and 2) to the snapshot storage 46, the control circuitry 64 queues a corresponding series 100 of B-tree insertion tasks 102(1), 102(2), . . . (collectively, tasks 102), also see the snapshot metadata 72 in FIG. 2. The control circuitry 64 updates the B-tree structure 54' based on these B-tree insertion tasks 102.

Each insertion task 102 has a mapping pair 104(1), 104(2), . . . (collectively, mapping pairs 104) which includes a file system (or production) block number and a snapshot block number of the snapshot storage 46. The file system block number identifies the block location of the primary data in the production file system 44 (i.e., the source of the old host data). The snapshot block number identifies the block location of the corresponding snapshot data in the snapshot storage 46 (i.e., the destination of the copied primary data).

For example, task 102(1) includes a mapping pair 104(1) which maps file system block number 13 to snapshot block number 6129. Similarly, task 102(2) includes another mapping pair 104(2) which maps file system block number 2 to snapshot block number 8247, and so on.

While the tasks 102 are queued for processing, the control circuitry 64 identifies contiguous ranges 106 of file system block numbers among the series 100 of tasks 102. If the control circuitry 64 discovers such a contiguous range 106, the control circuitry 64 aggregates that contiguous range 6 into an aggregated B-tree insertion task 102(A). That is, the control circuitry 64 treats the aggregated B-tree insertion task 102(A) as a single extent-based B-tree insertion task 102 requiring insertion of multiple mapping pairs 104 covering the range (or extent) 106 of contiguous blocks. By way of example, the aggregated task 102(A) is a single task requiring insertion of multiple mapping pairs 104(2), 104(3), 104(4), and 104(5) covering contiguous file system blocks locations 50 (FIG. 2) addressed as block numbers 2, 3, 4, and 5 within the mapping space of the data storage assembly 24 (also see FIG. 2).

FIG. 4 shows an example B-tree structure 54' having multiple nodes 120. In particular, the B-tree structure 54' includes non-leaf nodes 120(N) and leaf nodes 120(L). In this example, non-leaf node 120(N)(1) is the root node of the B-tree. Non-leaf node 120(N)(2) is a child node of non-leaf node 120(N)(1), and a parent node to leaf nodes 120(L)(1), 120(L)(2), 120(L)(3), and 120(L)(4). Similarly, non-leaf node 120(N)(3) is a child node of non-leaf node 120(N)(1), and a parent node to leaf nodes 120(L)(5) and 120(L)(6). As shown in FIG. 4, each node 120 includes an object containing a key value which (i) identifies a respective file system data block copied to the snapshot storage area and (ii) operates as a search key to facilitate searching of nodes of the example B-tree structure 54'.

Also, by way of example, the B-tree structure 54' is configured as a B+ tree. That is, the non-leaf nodes 120(N) primarily store key information, while the leaf nodes 120(L) store both key information as well as mapping pairs 104 (also see FIG. 3).

During operation, the control circuitry 64 (FIG. 2) is capable of traversing the example B-tree structure 54' (e.g., searching the B-tree structure 54' in order to locate blocks of snapshot data corresponding to blocks of primary data copied from the production file system 44 to the snapshot storage 46) and updating the example B-tree structure 54' (e.g., adding data, splitting nodes 120 as needed, etc.). Along these lines, the control circuitry 64 provides a multithread environment by providing multiple threads of execution. In connection with the example B-tree structure 54', the threads coordinate their operation using locks in order to preserve integrity of the example B-tree structure 54' while accessing the example B-tree structure 54' (e.g., when updating the example B-tree structure 54' with the tasks 102, also see FIG. 3).

Along these lines, the example B-tree structure 54' is shown in FIG. 4 as having recently been updated based on task 102(1) in which a leaf node 120(L)(2) includes a mapping pair 104(2) which maps file system block number 13 to snapshot block number 6129. This update may have been performed by a thread locking the example B-tree structure 54' and performing a simple B-tree insertion operation, i.e., a non-extent-based B-tree insertion operation since the task 102(1) did not cover an extent but simply one block location.

At this point, a thread of the control circuitry 64 is ready to process another task 102 from the series 100 (FIG. 3). Rather than process the tasks 102(2), 102(3), 102(4), 102(5), individually one at a time, the control circuitry 64 has aggregated these tasks 102 into an aggregated insertion task 102(A) by detecting a contiguous range of file system block numbers within the mapping pairs 104. Accordingly, based on the values of the file system block numbers (used as keys), the thread traverses the example B-tree structure 54' until non-leaf node 120(N)(2) is reached. In this example, the thread determines that all of the mapping pairs 104 of the task 102(A) are able to fit within the appropriate leaf node 120(L)(1). Accordingly, the thread requests a lock on the leaf node 120(L)(1) and, upon receiving the lock, inserts the mapping pairs 104 into the leaf node 120(L)(1) as shown in FIG. 5. This operation is considered an efficient single B-tree insertion operation since it is performed using a single lock and involves adding data under a single B-tree transaction.

While the lock-holding thread has the lock on the leaf node 120(L)(1) other threads are unable to access the leaf node 120(L)(1) thus preventing another thread from inadvertently obtaining unreliable data. Once the lock-holding thread has completed updating of the leaf node 120(L)(1), the lock-holding thread releases the lock of the leaf node 120(L)(1) and other threads are then able to request and lock that leaf node 120(L)(1) (e.g., the threads running on data storage assembly 24 can continue processing the remainder of the series 100 of tasks 102, can perform other B-tree operations, and so on).

It should be understood that if the tasks 102(2), 102(3), 102(4), and 102(5) had been processed one at a time to update the example B-tree structure 54', there would have been considerably more B-tree insertion pressure (i.e., more update operations required). Additionally, there would have been more lock contention (i.e., there would have been more lock requests for the leaf node 120(L)(1). Furthermore, there would have been an increase in certain types of overhead (e.g., lock resources, etc.). However, with the single extent-based B-tree insertion operation to address the aggregated task 102(A), there is significantly less B-tree insertion pressure, less lock contention, and less overhead consumption.

It should be further understood that the above-provided example was made simple in order to illustrate certain aspects of the improved techniques. The same activities are capable of being performed under other circumstances such as with a larger memory space (i.e., higher ranges of block numbers), with node splitting (i.e., locks imposed on the nodes 120 that must be locked in order to preserve integrity), and so on.

Figure 6:
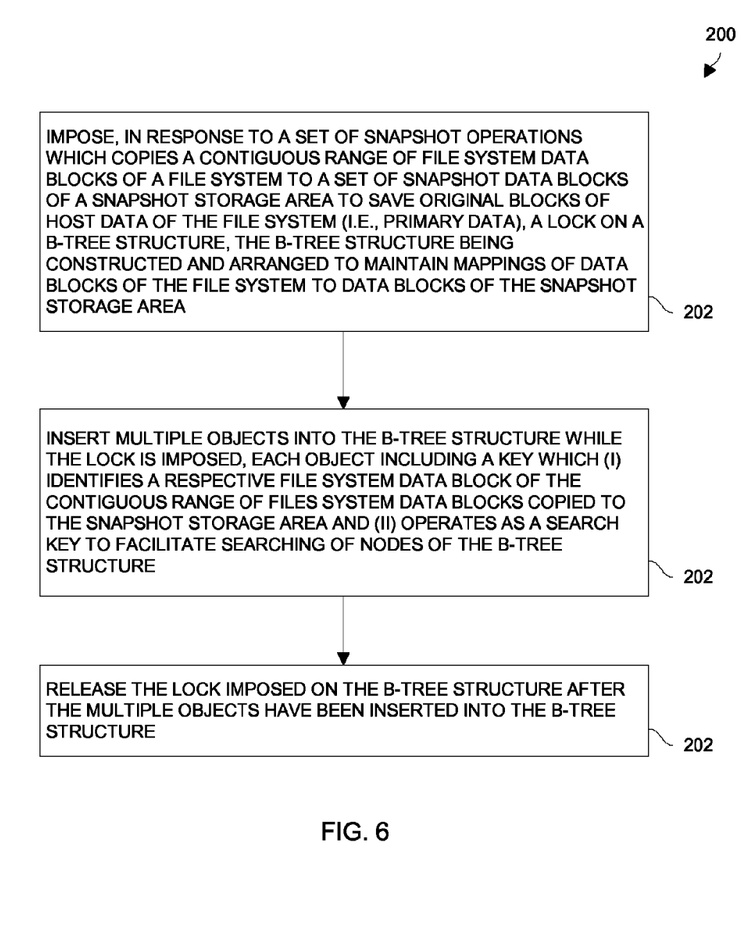
FIG. 6 is a flowchart of a procedure which is performed by the data storage assembly when managing access to a B-tree structure.

FIG. 6 shows a procedure 200 which is performed by the control circuitry 64 (FIG. 2) when executing a particular thread to carry out efficient extent-based B-tree insertion. The procedure 200 begins when the control circuitry 64 has aggregated a series of tasks 102 into an aggregated task 102(A) (also see FIG. 3).

In step 202, the control circuitry 64 imposes, in response to a set of snapshot operations which copies a contiguous range of file system data blocks of a file system to a set of snapshot data blocks of a snapshot storage area to save primary data of the file system (i.e., original host data), a lock on the B-tree structure 54 (see FIG. 4). Recall that the B-tree structure 54 is constructed and arranged to maintain mappings 104 of data blocks of the file system 44 to data blocks of the snapshot storage area 46.

In step 204, the control circuitry 64 inserts multiple objects into the B-tree structure 54 while the lock is imposed. Each object includes a key value which (i) identifies a respective file system data block of the contiguous range of file system data blocks copied to the snapshot storage area and (ii) operates as a search key to facilitate searching of nodes of the B-tree structure 54. At this point, all of the objects have been inserted into the B-tree structure under a single lock.

In step 206, the control circuitry 64 releases the lock imposed on the B-tree structure 54 after the multiple objects have been inserted into the B-tree structure 54. Once the lock is relinquished, the control circuitry 64 may run other threads which access the B-tree structure 54.

As described above, improved techniques involve imposing a lock on a B-tree structure 54 while the B-tree structure 54 is updated with multiple mappings 104 in response to copying of a contiguous range of data blocks between a file system 44 and a snapshot storage area 46. Such fast B-tree insertion techniques may involve aggregating consecutive file system blocks into an extent (i.e., an extent being multiple contiguous file system blocks), and performing a single extent-based B-tree insertion operation based on the extent. The resulting B-tree structure 54 may have the same organization as if the B-tree structure 54 had been updated individually via individual insertion operations one at a time. However, with the improved techniques, data reflecting an entire extent of multiple data blocks is inserted with one insertion operation which significantly reduces B-tree insertion pressure, eases lock contention, and reduces overhead consumption.

While various embodiments of the invention have been particularly shown and described, it will be understood by those skilled in the art that various changes in form and details may be made therein without departing from the spirit and scope of the disclosure.

What is claimed is:

1. A data storage apparatus, comprising:
    a host interface constructed and arranged to communicate with a set of host devices;
    memory having a file system area and a snapshot storage area; and
    a controller coupled to the host interface and the memory, the controller being constructed and arranged to:
        impose, in response to a snapshot operation which copies a contiguous range of file system data blocks of a file system in the file system area of the memory to a set of snapshot data blocks of the snapshot storage area of the memory to save original host data of the file system obtained through the host interface, a lock on the B-tree structure, the B-tree structure being constructed and arranged to maintain mappings of data blocks of the file system to data blocks of the snapshot storage area,
        insert multiple objects into the B-tree structure while the lock is imposed, each object including a key value which (i) identifies a respective file system data block of the contiguous range of file system data blocks copied to the snapshot storage area and (ii) operates as a search key to facilitate searching of nodes of the B-tree structure, and release the lock imposed on the B-tree structure after the multiple objects have been inserted into the B-tree structure.

2. A data storage apparatus as in claim 1 wherein the controller, when inserting the multiple objects into the B-tree structure while the lock is imposed, is constructed and arranged to:

for each file system data block of the contiguous range of files system data blocks of the file system copied to the set of snapshot data blocks of the snapshot storage area, save a respective block number mapping pair corresponding to that file system data block in the B-tree structure, the respective block number mapping pair including (i) a file system block number identifying that file system data block and (ii) a snapshot block number identifying a snapshot data block of the set of snapshot data blocks storing original host data copied from that file system data block;

wherein multiple block number mapping pairs are saved in the B-tree structure while the lock is imposed.

3. A data storage apparatus as in claim 2 wherein the controller is further constructed and arranged to:

access a list of input/output (IO) operations identifying, in serial order, copy operations which copy data blocks of the file system to data blocks of the snapshot storage area, detect, as the contiguous range of file system data blocks, a sequence of adjacent file system block numbers on the list, and provide, in response to detection of the sequence of the adjacent file system block numbers on the list, a lock request to impose the lock on the B-tree structure.

4. A data storage apparatus as in claim 3 wherein the data storage apparatus provides a multithread environment in which multiple threads content for shared access to the B-tree structure;

wherein the data storage apparatus further comprises a lock module; and wherein the controller, when providing the lock request, is constructed and arranged to:

submit the lock request to a lock request queue of a lock module of the data storage apparatus, and wait until the lock is imposed on the B-tree structure in response to the lock request before saving the multiple block number mapping pairs in the B-tree structure.

5. A data storage apparatus as in claim 4 wherein the lock module of the data storage apparatus is constructed and arranged to provide lock management which serializes access to a portion of the B-tree structure under contention from multiple threads.

6. A data storage apparatus as in claim 4 wherein the lock module of the data storage apparatus is constructed and arranged to provide lock management which permits simultaneous access to different parts of the B-tree structure by multiple threads.

7. A computer program product having a non-transitory computer readable medium which stores a set of instruction for managing access to a B-tree structure, the set of instructions, when performed by computerized circuitry, causing the computerized circuitry to perform a method of:

in response to a snapshot operation which copies a contiguous range of file system data blocks of a file system to a set of snapshot data blocks of a snapshot storage area to save original host data of the file system, imposing a lock on the B-tree structure, the B-tree structure being constructed and arranged to maintain mappings of data blocks of the file system to data blocks of the snapshot storage area;

inserting multiple objects into the B-tree structure while the lock is imposed, each object including a key value which (i) identifies a respective file system data block of the contiguous range of file system data blocks copied to the snapshot storage area and (ii) operates as a search key to facilitate searching of nodes of the B-tree structure; and releasing the lock imposed on the B-tree structure after the multiple objects have been inserted into the B-tree structure.

8. A computer program product as in claim 7 wherein inserting the multiple objects into the B-tree structure while the lock is imposed includes:

for each file system data block of the contiguous range of files system data blocks of the file system copied to the set of snapshot data blocks of the snapshot storage area, saving a respective block number mapping pair corresponding to that file system data block in the B-tree structure, the respective block number mapping pair including (i) a file system block number identifying that file system data block and (ii) a snapshot block number identifying a snapshot data block of the set of snapshot data blocks storing original host data copied from that file system data block;

wherein multiple block number mapping pairs are saved in the B-tree structure while the lock is imposed.

9. A computer program product as in claim 8, further comprising:

accessing a list of input/output (IO) operations identifying, in serial order, copy operations which copy data blocks of the file system to data blocks of the snapshot storage area, detecting, as the contiguous range of file system data blocks, a sequence of adjacent file system block numbers on the list, and providing, in response to detection of the sequence of the adjacent file system block numbers on the list, a lock request to impose the lock on the B-tree structure.

10. A computer program product as in claim 9 wherein the data storage apparatus provides a multithread environment in which multiple threads content for shared access to the B-tree structure; and wherein providing the lock request includes:

submitting the lock request to a lock request queue of a lock module of the data storage apparatus, and waiting until the lock is imposed on the B-tree structure in response to the lock request before saving the multiple block number mapping pairs in the B-tree structure.

11. In a data storage apparatus constructed and arranged to store host data, a method of managing access to a B-tree structure, the method comprising:

in response to a snapshot operation which copies a contiguous range of file system data blocks of a file system to a set of snapshot data blocks of a snapshot storage area to save original host data of the file system, imposing a lock on the B-tree structure, the B-tree structure being constructed and arranged to maintain mappings of data blocks of the file system to data blocks of the snapshot storage area;

inserting multiple objects into the B-tree structure while the lock is imposed, each object including a key value which (i) identifies a respective file system data block of the contiguous range of file system data blocks copied to the snapshot storage area and (ii) operates as a search key to facilitate searching of nodes of the B-tree structure; and releasing the lock imposed on the B-tree structure after the multiple objects have been inserted into the B-tree structure.

12. A method as in claim 11 wherein inserting the multiple objects into the B-tree structure while the lock is imposed includes:

for each file system data block of the contiguous range of files system data blocks of the file system copied to the set of snapshot data blocks of the snapshot storage area, saving a respective block number mapping pair corresponding to that file system data block in the B-tree structure, the respective block number mapping pair including (i) a file system block number identifying that file system data block and (ii) a snapshot block number identifying a snapshot data block of the set of snapshot data blocks storing original host data copied from that file system data block;

wherein multiple block number mapping pairs are saved in the B-tree structure while the lock is imposed.

13. A method as in claim 12, further comprising:

accessing a list of input/output (IO) operations identifying, in serial order, copy operations which copy data blocks of the file system to data blocks of the snapshot storage area, detecting, as the contiguous range of file system data blocks, a sequence of adjacent file system block numbers on the list, and providing, in response to detection of the sequence of the adjacent file system block numbers on the list, a lock request to impose the lock on the B-tree structure.

14. A method as in claim 13 wherein the data storage apparatus provides a multithread environment in which multiple threads content for shared access to the B-tree structure; and wherein providing the lock request includes:

submitting the lock request to a lock request queue of a lock module of the data storage apparatus, and waiting until the lock is imposed on the B-tree structure in response to the lock request before saving the multiple block number mapping pairs in the B-tree structure.

15. A method as in claim 14 wherein the lock module of the data storage apparatus is constructed and arranged to provide lock management which serializes access to a portion of the B-tree structure under contention from multiple threads.

16. A method as in claim 14 wherein the lock module of the data storage apparatus is constructed and arranged to provide lock management which permits simultaneous access to different parts of the B-tree structure by multiple threads.

17. A method as in claim 12 wherein inserting the multiple objects into the B-tree structure while the lock is imposed includes:

adding the multiple block number mapping pairs to a single node to the B-tree structure while the lock is imposed on the B-tree structure.

18. A method as in claim 12 wherein inserting the multiple objects into the B-tree structure while the lock is imposed includes:

performing a set of node split operations on the B-tree structure, and adding the multiple block number mapping pairs to the nodes of the B-tree structure during the set of node split operations and while the lock is imposed on the B-tree structure.

19. A method as in claim 12 wherein the B-tree structure is a B+ tree having parent nodes and leaf nodes; and wherein inserting the multiple objects into the B-tree structure while the lock is imposed includes providing the multiple block number mapping pairs in only the leaf nodes of the B+ tree.

20. In an electronic apparatus, a method of managing access to a B-tree structure having multiple nodes, the method comprising:

imposing a lock on at least a portion of the B-tree structure;

inserting multiple keyed objects into the B-tree structure while the lock is imposed, each keyed object including a key value to operate as a key in a node of the B-tree structure; and releasing the lock after the multiple keyed data objects have been inserted into the B-tree structure.

* * * * *